(12) United States Patent
Hong

(10) Patent No.: US 7,470,365 B2
(45) Date of Patent: Dec. 30, 2008

(54) SLUDGE CONCENTRATION SYSTEM WHICH HAVE FUNCTIONS FOR AUTOMATICALLY CHARGING A COAGULANT AND FOR AUTOMATICALLY CONTROLLING THE CONCENTRATION OF A SLUDGE

(75) Inventor: Sang Hun Hong, Seoul (KR)

(73) Assignee: Ark Co. Ltd., Gyeonggi-do (KR)

( * ) Notice: Subject to any disclaimer, the term of this patent is extended or adjusted under 35 U.S.C. 154(b) by 277 days.

(21) Appl. No.: 11/249,007

(22) Filed: Oct. 11, 2005

(65) Prior Publication Data

US 2006/0081544 A1    Apr. 20, 2006

Related U.S. Application Data

(63) Continuation-in-part of application No. PCT/KR2004/000719, filed on Mar. 30, 2004.

(30) Foreign Application Priority Data

Apr. 11, 2003  (KR) .............. 10-2003-0022839
Feb. 26, 2004  (KR) .............. 10-2004-0012976

(51) Int. Cl.
*C02F 11/14* (2006.01)

(52) U.S. Cl. .............. 210/205; 210/202; 210/211; 210/213; 210/216; 210/383; 210/396; 210/488

(58) Field of Classification Search ............... 210/211
See application file for complete search history.

(56) References Cited

U.S. PATENT DOCUMENTS 5,160,041 A * 11/1992 Taniguchi et al. .......... 210/205
5,183,562 A    2/1993 Totoki et al.
5,380,436 A * 1/1995 Sasaki ....................... 210/383
5,382,356 A    1/1995 Thogho et al.
6,258,262 B1 * 7/2001 Katabe ....................... 210/174
6,386,752 B1 * 5/2002 Hagino et al. ............... 366/309

(Continued)

FOREIGN PATENT DOCUMENTS

JP      11-254000 A     9/1999

(Continued)

OTHER PUBLICATIONS

PCT/KR2004/000719 International Search Report, Jul. 19, 2004.

*Primary Examiner*—Peter A. Hruskoci
(74) *Attorney, Agent, or Firm*—Graybeal Jackson LLP

(57) ABSTRACT

The present invention provides a system for sludge treatment which transfers sludge into a dewatering device while maintaining the sludge density at a predetermined level constant suitable for dewatering the sludge even when the density of the precipitated sludge varies, thus improving the sludge treating efficiency and sludge dewatering efficiency, and reducing the amount of a coagulant to be used. In the system for sludge treatment, a sludge concentration device is installed in a mixing flocculation tank. Thus, the sludge is mixed with the coagulant and flocculated in the mixing flocculation tank to produce flocs and a supernatant, while the supernatant is directly discharged from the mixing flocculation tank. Furthermore, the amount of the supernatant is controlled to maintain the desired density of the flocs to be transferred to the dewatering device. Thus, the dewatering device can be stably operated.

4 Claims, 13 Drawing Sheets

U.S. PATENT DOCUMENTS 7,191,700 B2 * 3/2007 Sasaki .................. 100/117

FOREIGN PATENT DOCUMENTS

| JP | 2000-246296 | A | 9/2000 |
| JP | 2001-224913 | A | 8/2001 |
| KR | 10-0329318 | B1 | 8/2000 |
| KR | 20-0224816 | Y1 | 5/2001 |

* cited by examiner

SLUDGE CONCENTRATION SYSTEM WHICH HAVE FUNCTIONS FOR AUTOMATICALLY CHARGING A COAGULANT AND FOR AUTOMATICALLY CONTROLLING THE CONCENTRATION OF A SLUDGE

CROSS-REFERENCE TO RELATED APPLICATION

This is a continuation-in-part application that claims benefit, under 35 USC §120, of co-pending International Application PCT/KR2004/000719, filed 30 Mar. 2004, designating the United States, which claims foreign priority benefits under 35 USC §119(a) to Korean Patent Applications No. 10-2003-0022839, filed 11 Apr. 2003, and 10-2004-0012976, filed 26 Feb. 2004, which are incorporated herein by reference.

TECHNICAL FIELD

The present invention relates to a system for sludge treatment and, more particularly, to system for sludge treatment concentration in which an automatic discharge device is provided in a mixing flocculation tank to automatically discharge a supernatant separated from sludge prior to a sludge dewatering process of a dewatering device, so that the sludge is introduced into the dewatering device while a density of the sludge is maintained at a predetermined level suitable for efficiently dewatering the sludge even when the density of the precipitated sludge varies, thus improving both the sludge treating efficiency and sludge dewatering efficiency, and reducing the amount of a coagulant to be used, and reducing labor.

BACKGROUND ART

Since the amount of wastewater has been quickly increased in recent years, environmental contamination caused by the wastewater became a serious problem. Various efforts to efficiently treat industrial wastewater have been developed.

Generally, physical/chemical wastewater treatment techniques have been typically used for treating industrial wastewater of high sludge content having heavy-metal contaminants. In the physical/chemical wastewater treatment techniques, sludge with heavy-metal contaminants is separated from water using a variety of chemicals or polymeric coagulants and, then, the sludge is dewatered using various dewatering devices, to thereby make sludge cakes which are then dried to be buried under the ground to be burnt. In the meantime, the supernatant separated from the sludge is treated through biological treatment techniques or physical/chemical treatment techniques.

In sewage treatment plants that are representative examples of facilities operated through biological treatment technologies, the BOD concentrations of the sewage introduced into the sewage treatment plants have been increased according to an improvement in the living standard. Thus, the content of microorganisms in the sludge of the sewage is increased to disturb the precipitation of the sludge. Furthermore, in recent years, existing sewage pipelines in which rainwater and sewage flow together within a pipeline without being separated have been change with new sewage pipelines in which rainwater and sewage separately flow through separate pipelines. Due to such a change of the sewage pipelines, the content of inorganic solids in the sludge of the sewage introduced into the sewage treatment plants is reduced, so that the sludge precipitation effect is reduced to cause a reduction in the density of the sludge. Thus, the sewage treatment plants suffer from a reduction in the operational performances of their dewatering devices and sludge digesters (facilities to reduce the quantity of sludge).

FIG. 12 schematically shows the construction of a conventional system for sludge treatment.

As shown in FIG. 12, water which has been separated from precipitated sludge of sewage due to a difference of specific weight between solids and liquids in a sedimentation basin 11 overflows from the basin to be drained, while the precipitated sludge is transferred to a sludge storage tank 12 through a first transfer line 31 by a pumping operation of a first pump 21. In the above state, the density of the precipitated sludge which is transferred to the sludge storage tank 12 varies according to variations in the temperatures and sludge contents, a change of season, a number of sludge transferring cycles, etc.

The sludge is, thereafter, transferred from the sludge storage tank 12 to a mixing flocculation tank 13 through a second transfer line 32 by a pumping operation of a second pump 22. In the above state, a coagulant used for separating water from the sludge is dissolved in water in a coagulant dissolution tank 14 by a first agitator 41, and, thereafter, fed to the mixing flocculation tank 13 through a third transfer line 33 by a pumping operation of a third pump 23. In the mixing flocculation tank 13, the sludge and the coagulant are mixed together by a second agitator 42, thus producing flocs. The flocs are, thereafter, transferred to a dewatering device 15 through a fourth transfer line 34, thus being dewatered in the dewatering device 15. To secure a stable operation and automation of the dewatering device 15, the flocculated sludge is required to maintain a predetermined constant density and a predetermined moisture content thereof, and to be in a state in that solids are sufficiently separated from liquid before the sludge is transferred to the dewatering device 15.

However, the amount of the coagulant which is added to the sludge transferred to the mixing flocculation tank 13 cannot be appropriately controlled due to a variety of variables, such as a variation in the sludge sizes caused by the variations in the sludge contents and temperatures, the change of season, and the activated states of microorganisms, sludge storage time and sludge storage state of the sludge storage tank, particularly in the case of a biological precipitation of the sludge. Furthermore, the density of the sludge transferred to the sludge storage tank 12 varies according to the number of the sludge transferring cycles to transfer the precipitated sludge from the sedimentation basin 11 to the sludge storage tank 12, and a seasonal variation in the sludge precipitation state of the sedimentation basin 11, etc. Thus, the variation in the density of the flocculent sludge transferred from the mixing flocculation tank to the dewatering device 15 may excessively vary to cause a reduction in the operational performance of the dewatering device 15, thus disturbing a proper operation of the dewatering device 15.

FIG. 13 schematically shows the construction of a conventional sludge concentration system according to another embodiment of the related art.

As shown in FIG. 13, the sludge precipitated in a sedimentation basin 51 is transferred to a centrifugal concentration device 52 through a first transfer line 71 by a pumping operation of a first pump 61. The centrifugal concentration device 52 concentrates the sludge to a predetermined level. Thereafter, the concentrated sludge is transferred to a sludge storage tank 53 through a second transfer line 72 by a pumping operation of a second pump 62.

Thereafter, the sludge is transferred from the sludge storage tank 53 to a mixing flocculation tank 55 through a third transfer line 73 by a pumping operation of a third pump 63. In the above state, a densitometer 57 is installed on an intermediate portion of the third transfer line 73 to measure the density of the transferred sludge.

Furthermore, a part of a coagulant, dissolved in water in a coagulant dissolution tank 54 by a first agitator 81, is fed to the mixing flocculation tank 55 through a fourth transfer line 74 by a pumping operation of a fourth pump 64. In the above state, the amount of the coagulant to be fed is controlled through a feedback control method in which the amount of the coagulant to be added is determined based on the density of the sludge measured by the densitometer 57. In the mixing flocculation tank 55, the sludge and the coagulant are mixed together by a second agitator 82, thus producing flocs. Thereafter, the flocs are transferred to a dewatering device 56 through a fifth transfer line 76, so that the dewatering device 56 dewaters the flocs.

When the sludge, which has been transferred from the sedimentation basin 51 through the first transfer line 71, is concentrated in the centrifugal concentration device 52, the sludge concentration process is executed using a centrifugal force determined based on both the density of the sludge and the precipitation characteristics of the sludge precipitated in the sedimentation basin 51. Thus, the density of the sludge may excessively vary and, furthermore, the sludge may not be concentrated to a desired level. Furthermore, the amount of the coagulant fed to the mixing flocculation tank 55 may vary according to the above-mentioned various parameters as well as the density of the sludge measured by the densitometer 57. Therefore, the densitometer 57 is not efficiently used, so that the conventional sludge concentration system is not practically used.

As described above, it is very difficult to automatically feed an appropriate amount of chemicals to the mixing flocculation tank due to the above-mentioned several causes. Furthermore, due to the variation in the density of the sludge transferred from the mixing flocculation tank to the dewatering device, the operation of the dewatering device cannot be appropriately managed. Thus, the system is operated depending on the sense of an operator of the system. This results in a various problems, such as a consumption of an excessive amount of chemicals, an inappropriate operation of the dewatering device, and an ineffective treatment of the sludge.

TECHNICAL PROBLEM

Figure 1:
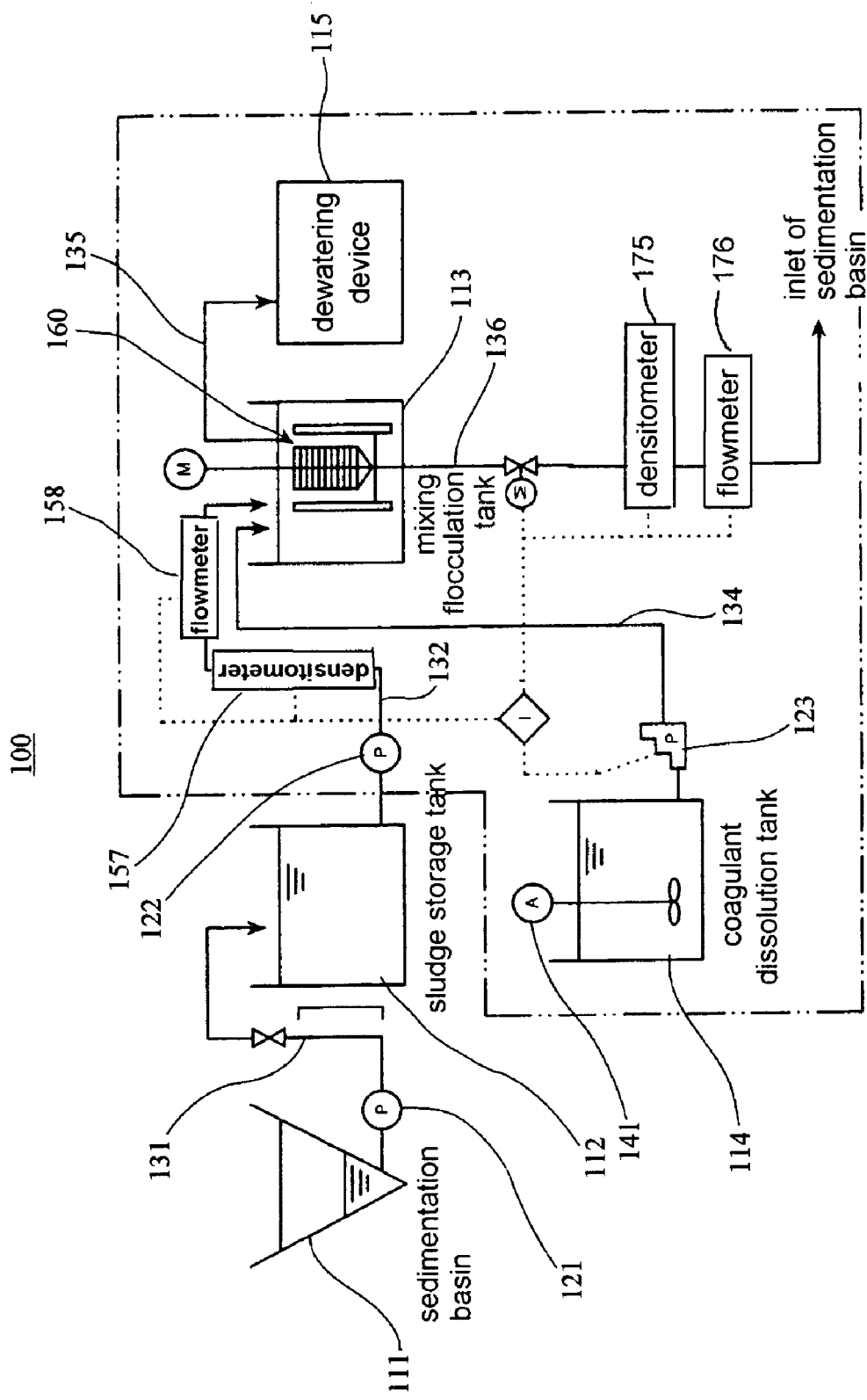
FIG. 1 is a view showing the construction of a sludge treatment system according to a preferred embodiment of the present invention.

Accordingly, the present invention has been made keeping in mind the above problems occurring in the prior art, and a first object of the present invention is to provide a system for sludge concentration which automatically discharges sludge to a dewatering device while maintaining a density of the sludge at a predetermined level suitable for efficiently dewatering the sludge even when the density of the precipitated sludge varies prior to a sludge dewatering process of a dewatering device, thus improving both the sludge treating efficiency and sludge dewatering efficiency, and reducing the amount of a coagulant to be used.

A second object of the present invention is to provide system for sludge concentration in which an automatic discharge device is provided in a mixing flocculation tank to automatically discharge water separated from sludge prior to a sludge dewatering process of a dewatering device, so that the sludge can be introduced into the dewatering device while a density of the sludge is maintained at a predetermined level suitable for efficiently dewatering the sludge even when the density of the precipitated sludge varies, thus improving both the sludge treating efficiency and sludge dewatering efficiency, and reducing the amount of a coagulant to be used.

TECHNICAL SOLUTION

In order to accomplish the above-mentioned first object, the present invention provides a process for sludge concentration using sequentially arranged sedimentation basin, sludge storage tank, coagulant dissolution tank, mixing flocculation tank, and dewatering device, and comprising: transferring sludge precipitated in the sedimentation basin into the sludge storage tank; transferring the sludge stored in the sludge storage tank into the mixing flocculation tank; feeding a coagulant from the coagulant dissolution tank into the mixing flocculation tank; mixing the sludge and the coagulant in the mixing flocculation tank by agitating them to form flocs and a supernatant; and transferring the flocs into the dewatering device to dewater the flocs in the dewatering device, wherein the flocs and the supernatant are controlled in the mixing flocculation tank to control the discharged amounts thereof and to maintain constant densities thereof while the supernatant is repeatedly recycled into the sedimentation basin through a drain extending from the mixing flocculation tank.

In the process, the supernatant discharged from the mixing flocculation tank through the drain is controlled by controlling an ON/OFF operation of a valve provided on an intermediate portion of the drain based on both the density and the flow rate of the supernatant measured by a second densitometer and a second flowmeter, which are installed on the intermediate portion of the drain, and, simultaneously, the amount of the coagulant fed from the coagulant dissolution tank into the mixing flocculation tank is controlled, thus finally controlling the density of the sludge transferred to the dewatering device.

Furthermore, in the process, the amount of the sludge entering the mixing flocculation tank from the sludge storage tank is controlled by controlling a pumping operation of a pump, which is installed on a sludge transfer line extending between the sludge storage tank and the mixing flocculation tank, under the condition that the amount of the supernatant discharged through the drain and recycled into the sedimentation basin is uniformly maintained.

In order to accomplish the above-mentioned first object, the present invention provides a system for sludge treatment, comprising: a sedimentation basin, a sludge storage tank, a coagulant dissolution tank, a mixing flocculation tank, a dewatering device, a first transfer line extending between the sedimentation basin and the sludge storage tank, a second transfer line extending between the sludge storage tank and the mixing flocculation tank, a second pump and a first densitometer provided on an intermediate portion of the second transfer line, a fourth transfer line extending between the coagulant dissolution tank and the mixing flocculation tank, a fifth transfer line extending between the mixing flocculation tank and the dewatering device, and the first densitometer provided on the intermediate portion of the second transfer line, wherein the mixing flocculation tank is provided therein with a sludge concentration device which mixes by agitation sludge and a coagulant, respectively transferred from the sludge storage tank and the coagulant dissolution tank into the mixing flocculation tank, to produce flocs, transfers the flocs into the dewatering device, and discharges a supernatant separated from the flocs to an outside.

ADVANTAGEOUS EFFECTS

As described above, the present invention provides a system for sludge treatment in which a sludge concentration device is installed in a mixing flocculation tank. Thus, sludge is mixed with a coagulant and flocculated in the mixing flocculation tank to produce flocs and a supernatant, while the supernatant is directly discharged from the mixing flocculation tank. Furthermore, the amount of the supernatant is controlled to maintain a constant density of the flocs to be transferred to the dewatering device. Thus, the dewatering device can be stably operated.

BEST MODE FOR INVENTION

Herein below, systems for sludge treatment according to the preferred embodiments of the present invention will be described in detail with reference to the accompanying drawings.

FIG. 1 is a view showing the construction of a sludge treatment system according to a preferred embodiment of the present invention.

As shown in FIG. 1, in the sludge treatment system 100 according to the preferred embodiment of the present invention, water separated from precipitated sludge due to a difference of specific weight between solids and liquids in a sedimentation basin 111 overflows from the basin to be drained, while the sludge is transferred to a sludge storage tank 112 through a first transfer line 131 by a pumping operation of a first pump 121. The sludge is, thereafter, transferred from the sludge storage tank 112 to a mixing flocculation tank 113 through a second transfer line 132 by a pumping operation of a second pump 122. Both a first densitometer 157 and a first flowmeter 158 are installed on an intermediate portion of the second transfer line 132. The first densitometer 157 and the first flowmeter 158 respectively measure the density and flow rate of the sludge which is transferred to the mixing flocculation tank 113, so that, before the sludge is finally transferred to a dewatering device 115, the density and flow rate of the sludge are controlled to be maintained at appropriate levels which are presented by the manufacturer of the dewatering device 115.

Furthermore, a coagulant used for separating water from the sludge is dissolved in water in a coagulant dissolution tank 114 by a first agitator 141, and, thereafter, fed to the mixing flocculation tank 113 through a third transfer line 134 by a pumping operation of a third pump 123. In the above state, to control the amount of the coagulant to be fed, a second densitometer 175 measures the density of the coagulant to control the rpm of the pump, in which the pump is interlocked with the second densitometer 175 and is controlled through a feedback control method.

In the mixing flocculation tank 113, the sludge and the coagulant are mixed by agitation in a sludge concentration device having an agitator, thus producing flocs and a supernatant. Thereafter, the flocs are transferred to the dewatering device 115 through a fifth transfer line 135, thus being dewatered in the dewatering device 115.

To secure a stable operation and automation of the dewatering device 115, the flocculated sludge which is the flocs is required to maintain a predetermined density and a predetermined moisture content thereof, and to be in a state in that solids are sufficiently separated from liquid before the sludge is transferred to the dewatering device 115.

To achieve the above object, the system according to the preferred embodiment of the present invention is provided in the mixing flocculation tank 113 with the sludge concentration device which allows for automatic feeding of chemicals and maintains the predetermined density of the sludge.

Figure 2:
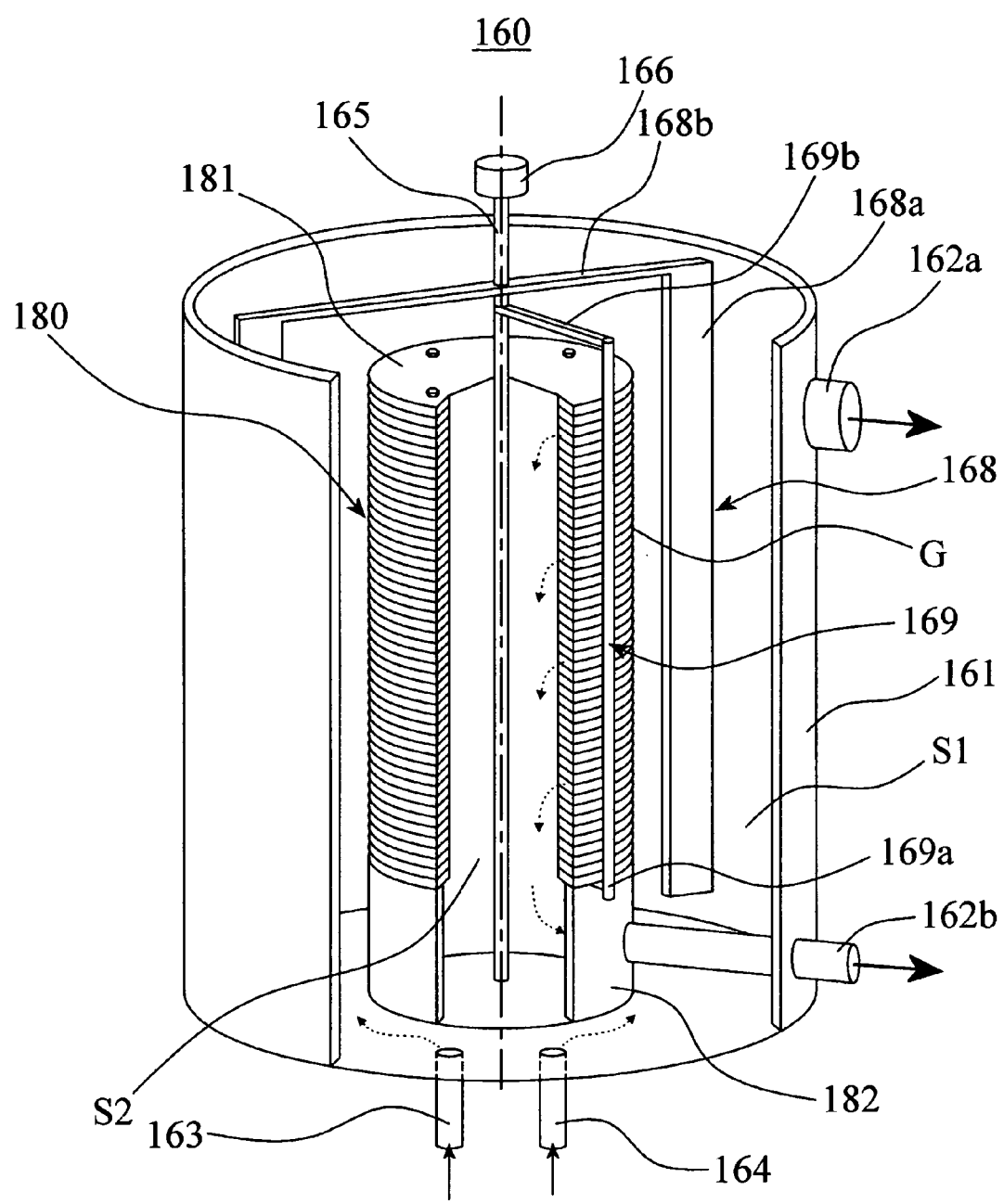
FIG. 2 is a view schematically showing the construction of a sludge concentration device that is installed in a mixing flocculation tank of FIG. 1.
Figure 3:
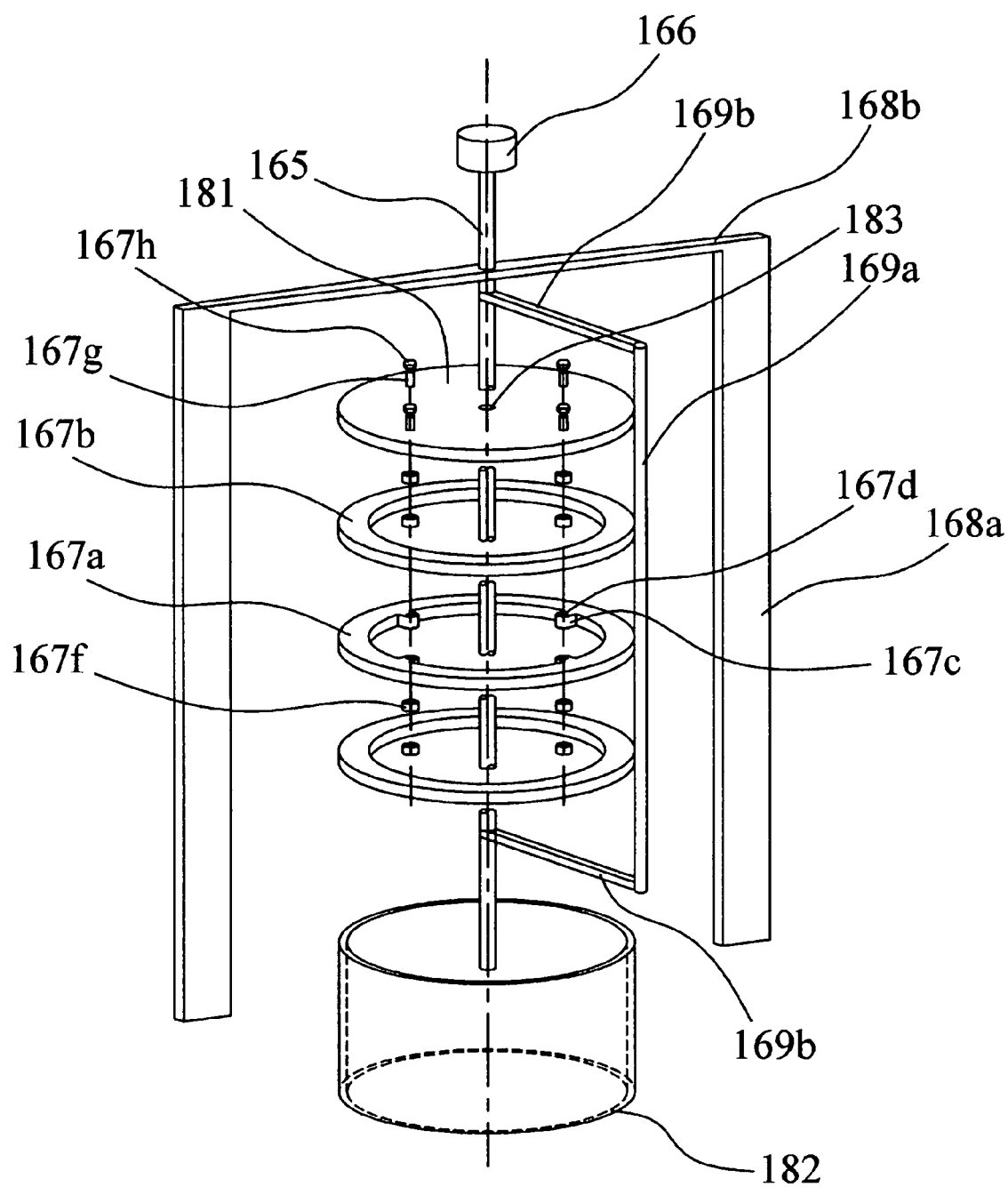
FIG. 3 is a view of a part of the sludge concentration device of FIG. 2.

FIGS. 2 and 3 are views showing the construction of a sludge concentration device 160 which is installed in the mixing flocculation tank 113 according to a first preferred embodiment of the present invention.

As shown in FIGS. 2 and 3, the sludge concentration device 160 according to the first preferred embodiment of the present invention comprises an external casing 161 which has a square column structure with side edges thereof rounded at a predetermined radius of curvature, or a cylindrical column structure. A flocs discharge line 162a extends outward from an upper portion of the external casing 161 to a predetermined length, thus discharging flocs produced by the agitation and mixing of the sludge and the coagulant to the outside.

The external casing 161, which defines therein a first space S1 that is a mixing space for the sludge and the coagulant, further includes a sludge inlet line 163 which extends outward from a bottom of the external casing 161 to a predetermined length. The sludge inlet line 163 introduces the sludge from the outside, which is the sludge storage tank 112, to the first space S1 of the external casing 161. The sludge inlet line 163 is connected to the second transfer line 132 extending from the sludge storage tank 112. Furthermore, a coagulant inlet line 164 extends outward to a predetermined length from the bottom of the external casing 161 at a position adjacent to the sludge inlet line 163. The coagulant inlet line 164 is connected to the fourth transfer line 134 extending from the coagulant dissolution tank 114.

Furthermore, a motored main shaft 165 is longitudinally provided in a center of the external casing 161, with a drive motor 166 provided on an upper end of the main shaft 165 to rotate the main shaft 165. In the above state, the drive motor 166 is mounted to a center of an upper wall (not shown) of the external casing 161 and is operated by electricity supplied thereto from an external electric power source (not shown).

The main shaft 165 extends through the inner surface of the external casing 161 in a longitudinal direction. A paddle-type agitator 168 is provided around the main shaft 165. The agitator 168 comprises two vertical paddles 168a that extend in the external casing 161 in a direction parallel to the main shaft 165, in other words, in a longitudinal direction of the external casing 161. A horizontal rod 168b extends between upper ends of the vertical paddles 168a to be mounted to the main shaft 165, thus supporting the vertical paddles 168a. Because the agitator 168 is mounted to the main shaft 165 by the horizontal rod 168b which is integrated at an intermediate portion thereof with the main shaft 165 into a single body, the agitator 168 during a rotation of the main shaft 165 rotates along with the main shaft 165 in the same direction as that of the main shaft 165. During the rotation of the main shaft 165, the agitator 168 rotates along with the main shaft 165 to mix the sludge and the coagulant in the first space S1 to flocculate the sludge.

Furthermore, in an inner region defined in the radial inside of the agitator 168, a rotary bar 169 is provided in a manner of being integrated with the main shaft 165 into a single body. The rotary bar 169 has a construction similar to that of the paddle-type agitator 168. In a detailed description, the rotary bar 169 comprises a vertical bar 169a which extends in the external casing 161 in a direction parallel to the main shaft 165, in other words, in a longitudinal direction of the external casing 161. The rotary bar 169 further comprises two horizontal bars 169b which horizontally extend from upper and lower ends of the vertical bar 169a to be mounted to the main shaft 165, thus supporting the vertical bar 169a. Because the rotary bar 169 is mounted to the main shaft 165 at the inner ends of the horizontal bars 169b, the rotary bar 169 during a rotation of the main shaft 165 rotates in the same direction as that of the main shaft 165.

An upper disk 181, a plurality of movable disks 167b and a plurality of stationary disks 167a are arranged to form a laminated structure around the main shaft 165 at a position inside the horizontal bars 169b of the rotary bar 169 of which the inner ends are mounted to the main shaft 165. Furthermore, a cylindrical lower support structure 182 is provided under the rotary bar 169 while surrounding the main shaft 165. In the above state, the upper disk 181, the plurality of movable disks 167b, the plurality of stationary disks 167a and the lower support structure 182 are assembled into a single body, thus providing a cylindrical screen-shaped structure 180 having predetermined gaps G, with a second space S2 defined in the cylindrical screen-shaped structure 180 to collect water prior to discharging water.

The main shaft 165 extending from the drive motor 166 passes through a shaft hole 183 that is formed through the center of the upper disc 181. Thereafter, the main shaft 165 extends into the interior of the lower support structure 182 while passing through the ring-shaped movable disks 167b and the ring-shaped stationary disks 167a. In the above state, the movable disks 167b and the stationary disks 167a are alternately arranged in the longitudinal direction of the main shaft 165 and separated from each other by a plurality of spacers 167f provided between them. Thus, the gaps G are defined between the movable disks 167b and the stationary disks 167a.

A plurality of locking projections 167c are provided on a radial inner surface of each of the stationary disks 167a, with a pin insert hole 167d provided in a middle portion of each of the locking projections 167c. The plurality of ring-shaped spacers 167f are arranged between the movable disks 167b and the stationary disks 167a, so that the movable disks 167b and the stationary disks 167a are spaced apart from each other at predetermined regular intervals.

The stationary disks 167a and the movable disks 167b are assembled with each other into the single body by a plurality of locking nuts 167h and a plurality of locking pins 167g which pass through pin through holes (not designated by any reference numeral) of the upper disk 181, the pin insert holes 167d of the stationary disks 167a and the spacers 167f.

When the main shaft 165 rotates after the sludge and the coagulant have been introduced into the mixing flocculation tank 113, the rotary bar rotates along with the main shaft 165. In the above state, the movable disks 167b and the stationary disks 167a define the cylindrical screen-shaped structure in which the movable disks 167b are spaced apart from the stationary disks 167a at predetermined regular gaps by the spacers 167f. Furthermore, the outer diameter of the movable disks 167b is determined to be larger than that of the stationary disks 167a, while the radius of rotation of the rotary bar is determined to be equal to the outer diameter of the stationary disks 167a. Thus, when the rotary bar rotates, the movable disks 167b fluctuate in a rotating direction thereof relative to the stationary disks 167a.

Furthermore, a supernatant discharge line 162b extends in a radial direction outward from a sidewall of the lower support structure 182 to a predetermined length. The supernatant discharge line 162b, extending in the radial direction from the sidewall of the lower support structure 182, sequentially passes through the first space and the external casing 161 to be projected outward and coupled to a drain 136 that is arranged at a lower portion of the mixing flocculation tank 113.

Herein below, the operational process of the sludge treatment system provided with the above-mentioned sludge concentration device 160 according to the first preferred embodiment of the present invention will be described with reference to the accompanying drawings.

First, the sludge precipitated in the sedimentation basin 111 is transferred into the sludge storage tank 112 through the first transfer line 131 by the pumping operation of the first pump 121. The sludge is, thereafter, transferred from the sludge storage tank 112 to the mixing flocculation tank 113 through the second transfer line 132 by the pumping operation of the second pump 122.

Furthermore, the coagulant used for separating water from the sludge is dissolved in water in the coagulant dissolution tank 114, and, thereafter, fed to the mixing flocculation tank 113 through the fourth transfer line 134 by the pumping operation of the third pump 123.

In the mixing flocculation tank 113, the sludge and the coagulant are mixed by agitation in the sludge concentration device 160, thus producing the flocs and the supernatant. In the above state, the sludge concentration device 160 according to the first preferred embodiment of the present invention maintains the sludge density at a predetermined level to secure the stable operation and automation of the dewatering device 115.

The a sludge concentration device 160 is operated as follows. When the main shaft 165 rotates by the drive motor 166, the sludge and the coagulant, which have been introduced into the mixing flocculation tank 113, in other words, into the external casing 161 of the sludge concentration device 160 through the sludge inlet line 163 and the coagulant inlet line 164, slowly move upward from the lower portion to the upper portion of the first space S1 while being mixed by agitation of the agitator 168 which rotates along with the main shaft 165.

In the above state, the flocs are stuck on the radial outer surfaces of the stationary disks 167a and the movable disks 167b while the flocs slowly move upward from the lower portion to the upper portion of the first space S1 according to the rotation of the main shaft 165. However, the flocs are removed from the disks by the vertical bar 169a of the rotary bar 169.

In the above state, because the vertical bar 169a of the rotary bar 169 which rotates along with the main shaft 165 comes into contact with the radial outer surfaces of the stationary disks 167a, the movable disks 167b fluctuate in a rotating direction thereof relative to the stationary disks 167a. Thus, the rotary bar 169 provides an automatic cleaning function of preventing the gaps G between the movable disks and the stationary disks from being blocked with fine flocs. Because the gaps G are prevented from being blocked, the device 160 smoothly discharges the supernatant. In the above state, the supernatant in the mixing flocculation tank flows into the second space S2 through the gaps G, and flows down to be discharged to the outside of the external casing 161 through the water discharge line 162b of the lower support structure 182. The supernatant is, thereafter, drained as drain water through the drain 136.

Furthermore, in the flocs produced by the flocculation, most solids have sizes not smaller than 1 mm if the sludge transferred from the mixing flocculation tank 113 has desired properties and an appropriate amount of chemicals has been added. In the above state, the supernatant has the SS density which is a constant density.

Figure 4:
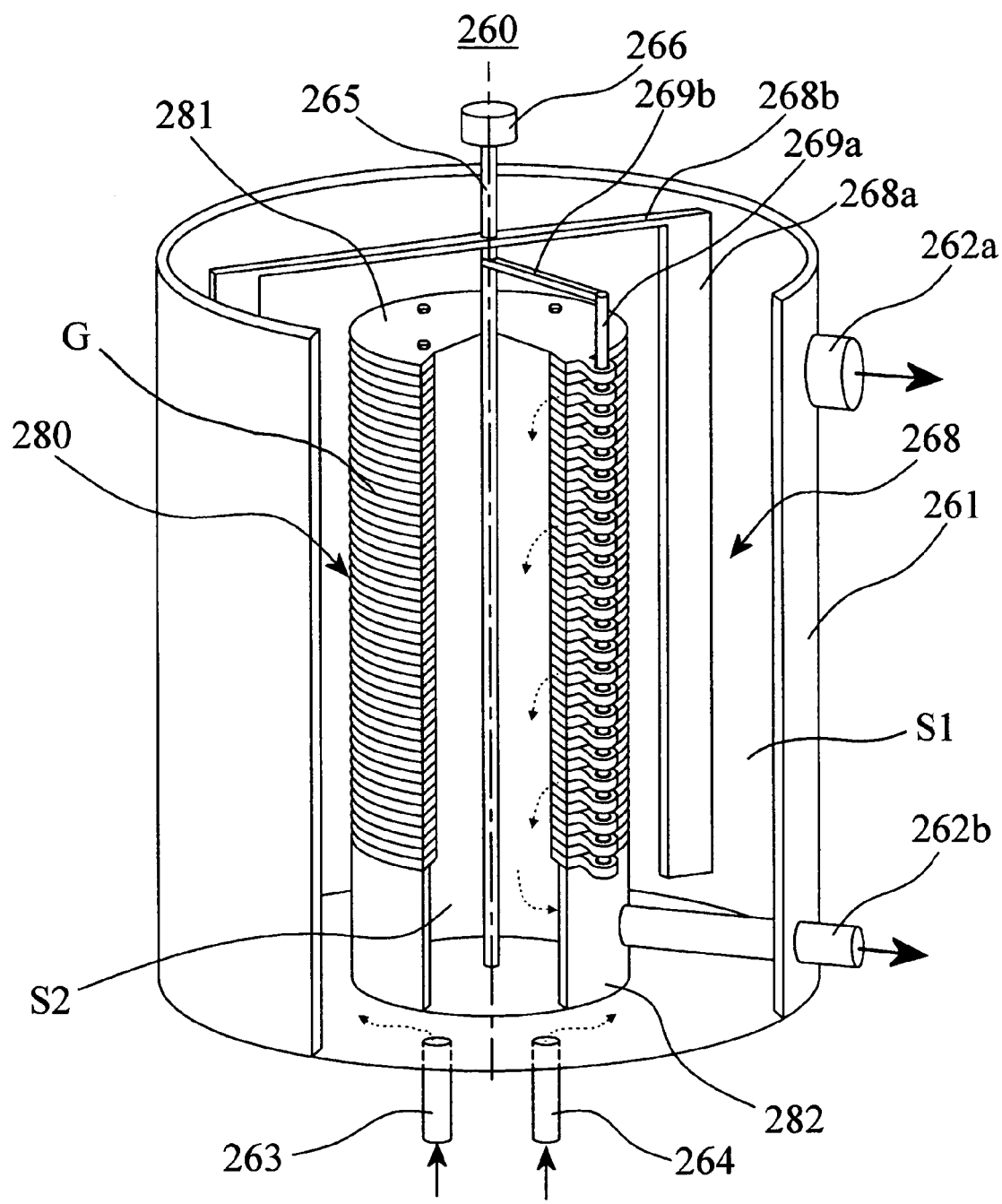
FIG. 4 is a view corresponding to FIG. 2, but schematically showing the construction of a sludge concentration device which is installed in the sludge treatment system according to another embodiment of the present invention.
Figure 5:
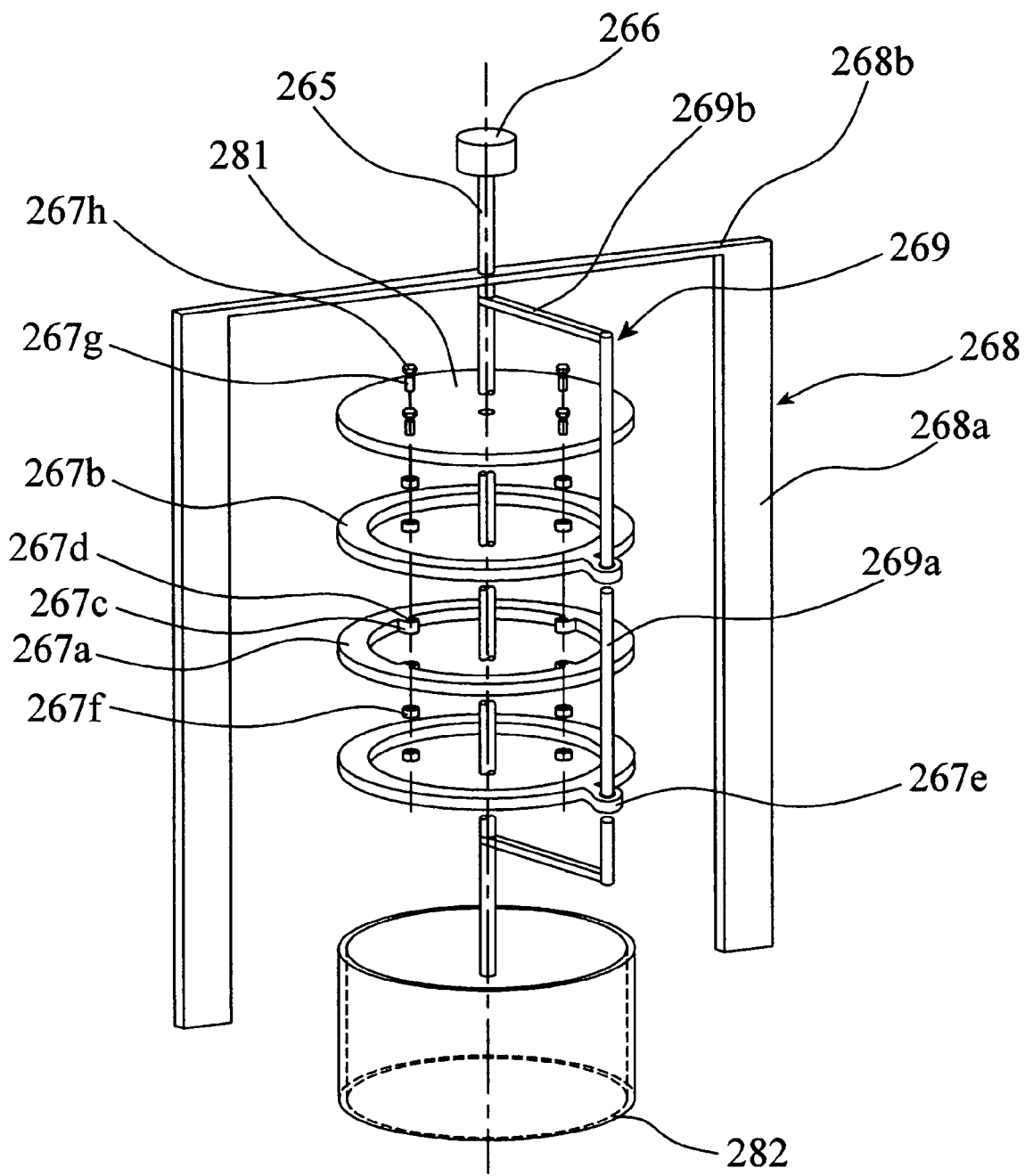
FIG. 5 is a view of a part of the sludge concentration device of FIG. 4.

FIGS. 4 and 5 show the construction of a sludge concentration device 260 which is installed in the mixing flocculation tank 113 according to a second preferred embodiment of the present invention.

In the second preferred embodiment of the present invention, the general shape of the sludge concentration device 260 remains the same as that of the sludge concentration device 160 according to the first preferred embodiment of the present invention which has been described above with reference to FIGS. 2 and 3, except for some parts of the cylindrical structure 280. Therefore, the elements designated by the same reference numerals as those of the first preferred embodiment are not described in the following description.

As shown in FIGS. 4 and 5, in the cylindrical structure 280 of the sludge concentration device 260 according to the second preferred embodiment of the present invention, a plurality of locking projections 267c are provided on a radial inner surface of each of the stationary disks 267a, with a pin insert hole 267d provided in a middle portion of each of the locking projections 267c. Furthermore, on a radial outer surface of each of the movable disks 267b, a ring-shaped projection 267e is provided. Furthermore, a plurality of ring-shaped spacers 267f are arranged between the stationary disks 267a and the movable disks 267b, so that the stationary disks 267a and the movable disks 267b are spaced apart from each other at predetermined regular intervals.

The stationary disks 267a and the movable disks 267b are assembled with each other into a single body by a plurality of locking nuts 267h and a plurality of locking pins 267g which pass through pin through holes (not designated by any reference numeral) of the upper disk 281, the pin insert holes 267d of the stationary disks 267a and the spacers 267f. In the above state, the vertical bar 269a of the rotary bar 269 according to the second preferred embodiment of the present invention is arranged to be inserted into the ring-shaped projections 267e of the movable disks 267b. Thus, when the main shaft 265 rotates, the movable disks 267b move in a manner dependent on the vertical bar 269a of the rotary bar 269 that rotates along with the main shaft 265. In the above state, the inner and outer diameters of the stationary disks 267a are equal to those of the movable disks 267b.

When the main shaft 265 rotates after the sludge and the coagulant have been introduced into the mixing flocculation tank 113, the movable disks 267b which are spaced apart from the stationary disks 267a at the predetermined gaps by the spacers 267f move relative to the stationary disks 267a in the rotating direction of the main shaft 265, thus providing an automatic cleaning function of preventing the gaps G from being blocked with fine flocs.

The operational process of the sludge treatment system provided with the above-mentioned sludge concentration device 260 according to the second preferred embodiment of the present invention is almost equal to that of the first preferred embodiment of the present invention.

The operational process of the sludge concentration device 260 will be described herein below based on the modified movable disks 267b. When the main shaft 265 rotates by the drive motor 266, the sludge and the coagulant slowly move upward from the lower portion to the upper portion of the first space S1 while being mixed to produce the flocs and the supernatant by agitation of the paddle-type agitator 268 which rotates along with the main shaft 265.

In the above state, the movable disks 267b rotate along with the vertical bar 269a of the rotary bar 269 around the main shaft 265 in the manner dependent on the vertical bar 269a of the rotary bar 269 which is arranged to be inserted into the ring-shaped projections 267e of the movable disks 267b. Thus, the vertical bar 269a of the rotary bar 269 which rotates along with the main shaft 265 comes into contact with the radial outer surfaces of the stationary disks 267a, so that the rotary bar 269 removes the flocs from the radial outer surfaces of the stationary disks 267a and the movable disks 267b. Therefore, the flocs are prevented from being introduced into the second space S2 through the gaps G of the cylindrical structure 280.

Furthermore, the movable disks 267b that rotate along with the rotary bar move in the circumferential direction relative to the stationary disks 267a, thus providing an automatic cleaning function of preventing the gaps G from being blocked with fine flocs.

The flocs, which have been produced by the flocculation of the sludge, are discharged from the first space S1 through the supernatant discharge line 262a. Furthermore, the supernatant flows into the second space S2 through the gaps G, and flows down to be discharged to the outside of the external casing 261 through the supernatant discharge line 262b of the lower support structure 282. The supernatant is, thereafter, drained as drain water through the drain 136.

Figure 6:
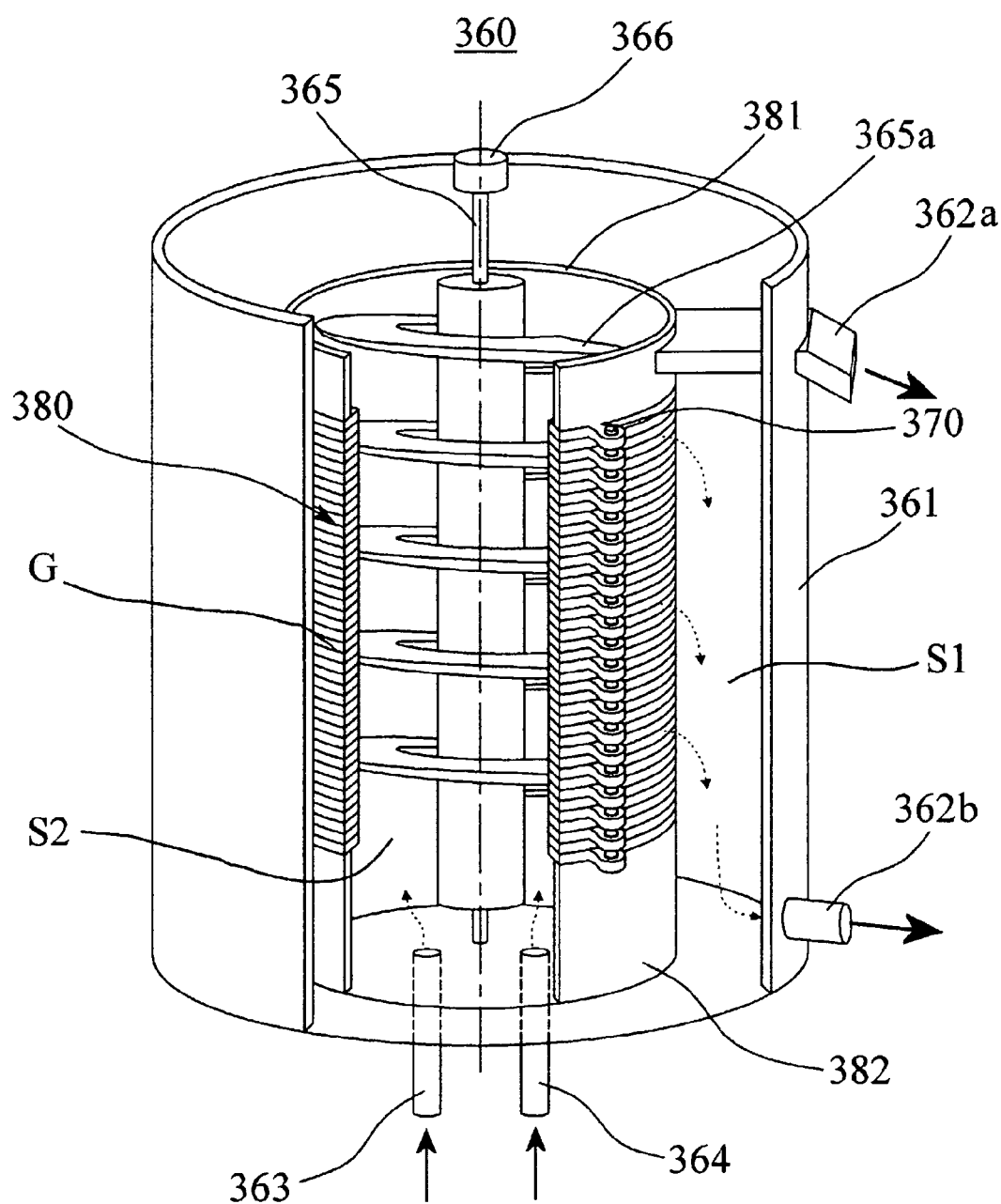
FIG. 6 is a view schematically showing the construction of a sludge concentration device which is installed in the mixing flocculation tank of FIG. 1 according to a further embodiment of the present invention.
Figure 7:
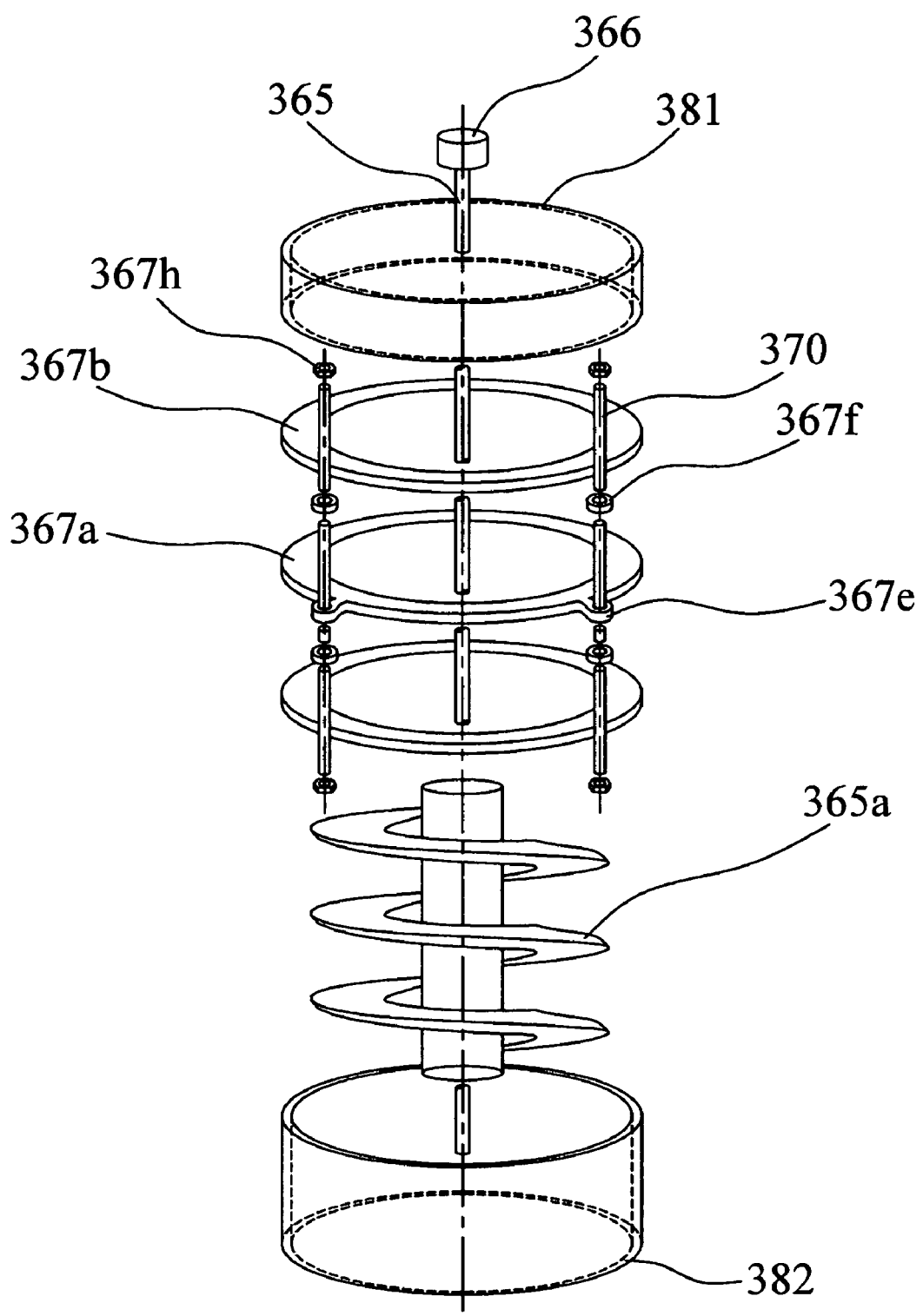
FIG. 7 is a view of a part of the a sludge concentration device of FIG. 6.

FIGS. 6 and 7 show the construction of a sludge concentration device 360 which is installed in the mixing flocculation tank 113 according to a further embodiment of the present invention.

In following description for the sludge concentration device 360 according to the third preferred embodiment of the present invention, the elements designated by the same reference numerals as those of the first preferred embodiment which has been described above with reference to FIGS. 2 and 3 are not described.

As shown in FIGS. 6 and 7, in the sludge concentration device 360 according to the third preferred embodiment of the present invention, an external casing 361 defines therein a first space S1. A supernatant discharge line 362a extends outward from an upper portion of the external casing 361 to a predetermined length, thus discharging flocs produced by the agitation and mixing of the sludge and the coagulant to the outside.

A main shaft 365 is longitudinally provided in a center of the external casing 361 of the automatic sludge/supernatant separation and discharge device 360. Furthermore, a helical thread 365a is provided around the radial outer surface of the main shaft 365 in a manner of being integrated with the main shaft 365 into a single body.

An upper support structure 381 opened at an upper end thereof, a plurality of movable disks 367b, a plurality of stationary disks 367a and a cylindrical lower support structure 382 are provided around the main shaft 365 having the helical thread 365a. In the above state, the upper support structure 381, the plurality of movable disks 367b, the plurality of stationary disks 367a and the lower support structure 382 are assembled to each other to form a cylindrical structure, thus providing a cylindrical structure 380 having a predetermined gap. A second space S2 is defined in the cylindrical structure 380.

Furthermore, a plurality of ring-shaped projections 367e are provided on the radial outer surfaces of the stationary disks 367a. The stationary disks 367a are assembled with each other into a single body by a locking rod 370 which passes through the plurality of ring-shaped projections 367e of the stationary disks 367a. Furthermore, a plurality of ring-shaped spacers 367f are arranged between the stationary disks 367a and the movable disks 367b, so that the stationary disks 367a and the movable disks 367b are spaced apart from each other at predetermined regular intervals, thus defining a gap G between them. In the above state, the movable disks 367b are movably arranged between the stationary disks 367a.

Furthermore, the inner diameter of the movable disks 367b is determined to be smaller than that of the stationary disks 367a. When the main shaft 365 rotates after the sludge and the coagulant have been introduced into the mixing flocculation tank 113, the sludge and the coagulant move upward from the lower portion to the upper portion of the space S2 by the rotation and agitation of the threaded shaft 365. In the above state, when the diameter of the movable disks 367b is determined to be smaller than that of the helical thread, the movable disks 367b rotate relative to the stationary disks 367a, thus providing an automatic cleaning function of preventing the gaps G from being blocked with the flocs. Therefore, the supernatant is smoothly discharged through the gaps G.

Furthermore, a supernatant discharge line 362b extends in a radial direction outward from a sidewall of the upper support structure 381 to a predetermined length. The supernatant discharge line 362b, extending in the radial direction from the sidewall of the upper support structure 381, sequentially passes through the first space S1 and the external casing 361 to be projected outward and coupled to a drain 136 that is arranged at a lower portion of the mixing flocculation tank 113.

Furthermore, a sludge inlet line 363 extends outward from a bottom of the lower support structure 382 to a predetermined length. The sludge inlet line 363 introduces the sludge from the outside, which is the sludge storage tank 112, to the second space S2 of the sludge concentration device 360. The sludge inlet line 363 passes through the bottom of the external casing 361 and is connected to the second transfer line 132 extending from the sludge storage tank 112.

Furthermore, a coagulant inlet line 364 extends outward to a predetermined length from the bottom of the lower support structure 382 at a position adjacent to the sludge inlet line 363. The coagulant inlet line 364 passes through the bottom of the external casing 361 and is connected to the fourth transfer line 134 extending from the coagulant dissolution tank 114.

Herein below, the operational process of the sludge concentration system provided with the above-mentioned sludge concentration device 360 according to the third preferred embodiment of the present invention will be described.

The operational process of the sludge concentration device 360 will be described herein below based on the cylindrical structure 380 having the gaps G. When the main shaft 365 rotates by the drive motor 366, the sludge and the coagulant, which have been introduced into the interior of the cylindrical structure 380, in other words, into the second space S2 through the sludge inlet line 363 and the coagulant inlet line 364, slowly move upward from the lower portion to the upper portion of the second space S2 by the thread 365a of the main shaft 365 while being mixed to produce the flocs and the supernatant.

In the above state, the flocs and the supernatant which are produced from the sludge and the coagulant in the second space move upward from the lower portion to the upper portion of the second space S2 by the rotation and agitation of the helical thread 365a of the main shaft 365. Thus, the supernatant is discharged into the first space S1 through the gaps G, while the flocs are discharged to the outside through the supernatant discharge line 362b.

Figure 8:
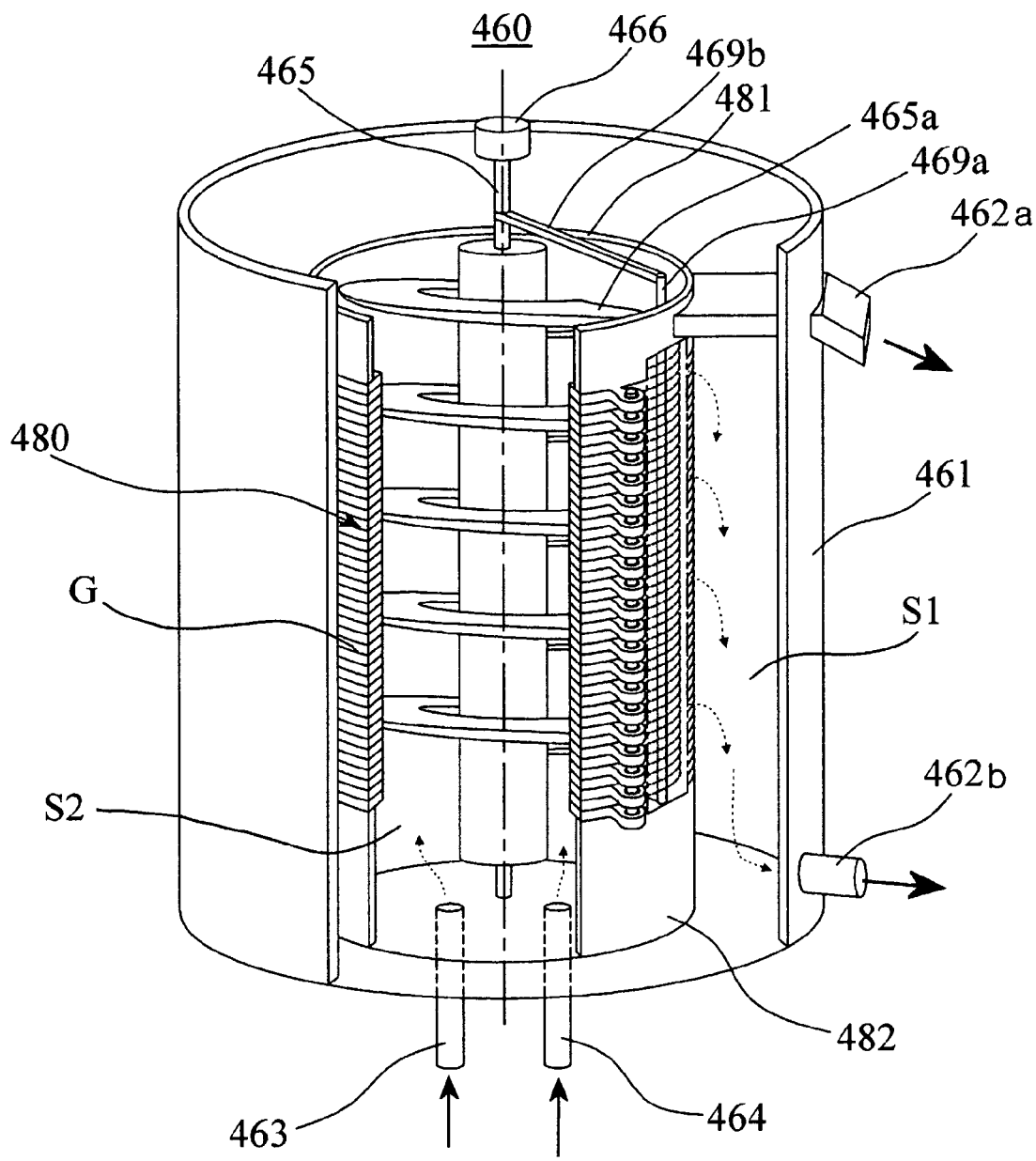
FIG. 8 is a view corresponding to FIG. 6, but schematically showing the construction of a sludge concentration device which is installed in the sludge treatment system according to still another embodiment of the present invention.
Figure 9:
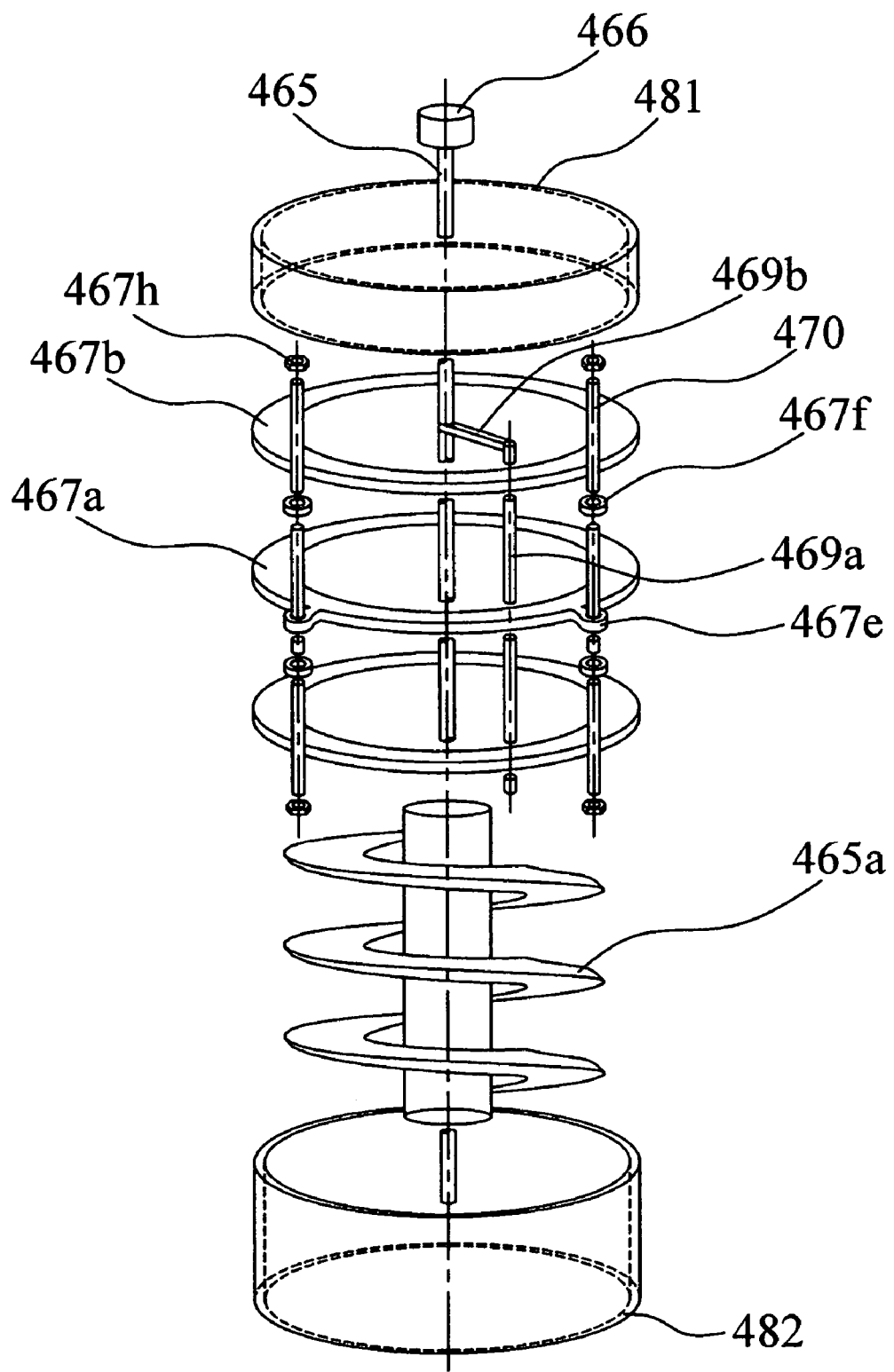
FIG. 9 is a view of a part of the sludge concentration device of FIG. 8.

FIGS. 8 and 9 show the construction of a sludge concentration device 460 which is installed in the mixing flocculation tank 113 according to a fourth preferred embodiment of the present invention.

In the fourth preferred embodiment of the present invention of FIGS. 8 and 9, the general shape of the sludge concentration device 460 remains the same as that of the sludge concentration device 360 according to the third preferred embodiment of the present invention which has been described above with reference to FIGS. 6 and 7, except for some parts of the cylindrical structure 480. Therefore, the elements designated by the same reference numerals as those of the third preferred embodiment are not described in the following description.

A main shaft 465 is longitudinally provided in the center of the external casing 461 of the sludge concentration device 460 according to the fourth preferred embodiment of the present invention. Furthermore, a helical thread 465a is provided around the radial outer surface of the main shaft 465 in a manner of being integrated with the main shaft 465 into a single body.

An upper support structure 481 opened at an upper end thereof, a plurality of movable disks 467b, a plurality of stationary disks 467a and a cylindrical lower support structure 482 are provided around the main shaft 465 having the helical thread 465a. In the above state, the upper support structure 481, the plurality of movable disks 467b, the plurality of stationary disks 467a and the lower support structure 482 are assembled to each other to provide a cylindrical structure 480 having predetermined gaps. A space S2 to discharge water is defined in the screen-shaped structure 480.

Furthermore, a sludge removing rotary bar is mounted to the main shaft 465 at a position inside the cylindrical structure 480. The rotary bar has the same construction as that of the rotary bar 169 according to the first preferred embodiment of the present invention. In a detailed description, the rotary bar comprises a vertical bar 469a which extends in the external casing 461 in a direction parallel to the main shaft 465, in other words, in a longitudinal direction of the external casing 461. The rotary bar further comprises two horizontal bars 469b which horizontally extend from upper and lower ends of the vertical bar 469a to be mounted to the main shaft 465, thus supporting the vertical bar 469a. Because the rotary bar is mounted to the main shaft 465 at the inner ends of the horizontal bars 469b, the rotary bar during a rotation of the main shaft 465 rotates in the same direction as that of the main shaft 465.

Furthermore, a plurality of ring-shaped projections 467e are provided on the radial outer surfaces of the stationary disks 467a. The stationary disks 467a are assembled with each other into a single body by a locking rod 470 which passes through the plurality of ring-shaped projections 467e. Furthermore, a plurality of ring-shaped spacers 467f are arranged between the stationary disks 467a and the movable disks 467b, so that the stationary disks 467a and the movable disks 467b are spaced apart from each other at predetermined regular intervals, thus defining a gap G between them. In the above state, the movable disks 467b are movably arranged between the stationary disks 467a. The vertical bar 469a of the rotary bar is placed inside the screen-shaped structure which is fabricated by an integration of the upper support structure 481, the plurality of movable disks 467b, the plurality of stationary disks 467a and the cylindrical lower support structure 482 into a single structure.

When the main shaft 465 rotates after the sludge and the coagulant have been introduced into the mixing flocculation tank 113, the rotary bar rotates along with the main shaft 465. In the above state, the movable disks 467b are spaced apart from the stationary disks 467a at the predetermined regular gaps by the spacers 467f. During the rotation of the main shaft 465, the movable disks 467b rotate and fluctuate relative to the stationary disks 467a by the vertical bar 469a of the rotary bar.

Herein below, the operational process of the sludge concentration system provided with the above-mentioned sludge concentration device 460 according to the fourth preferred embodiment of the present invention will be described.

The operational process of the sludge concentration device 460 will be described herein below based on the cylindrical structure 480 having the gaps G. When the main shaft 465 rotates by the drive motor 466, the sludge and the coagulant, which have been introduced into the interior of the cylindrical structure 480, in other words, into the second space S2 through the sludge inlet line 463 and the coagulant inlet line 464, slowly move upward from the lower portion to the upper portion of the second space S2 by the rotation and agitation of the helical thread 465a of the main shaft 465 while being mixed to produce the flocs and the supernatant. In the above state, the flocs slowly move upward to the upper portion of the second space S2, thus being discharged to the outside through the supernatant discharge line 462b. In the meantime, the supernatant is discharged into the first space S1 through the gaps G.

Because, the movable disks 467b are supported between the stationary disks 467a, which are assembled with each other into a single body by the locking rod 470 passing through the plurality of ring-shaped projections 467e of the stationary disks 467a, with the predetermined regular gaps defined between the disks, the supernatant is discharged to the outside through the gaps G defined between the stationary disks 467a and the movable disks 467b.

In the above state, the vertical bar 469a of the rotary bar, which rotates along with the main shaft 465, is in contact with the radial inner surfaces of both the stationary disks 467a and the movable disks 467b, while the radial outer surface of the locking rod 470 is in contact with the radial outer surfaces of the movable disks 467b. Thus, the flocs are removed from the disks, so that the gaps G between the stationary disks 467a are efficiently prevented from being blocked with the mixture of the sludge and the coagulant. Furthermore, the supernatant smoothly flows into the first space S1 through the gaps G of the cylindrical structure 480. In the meantime, the flocculated sludge is discharged from the cylindrical structure 480 through the supernatant discharge line 462a provided on the lower portion of the external casing 461.

Figure 10:
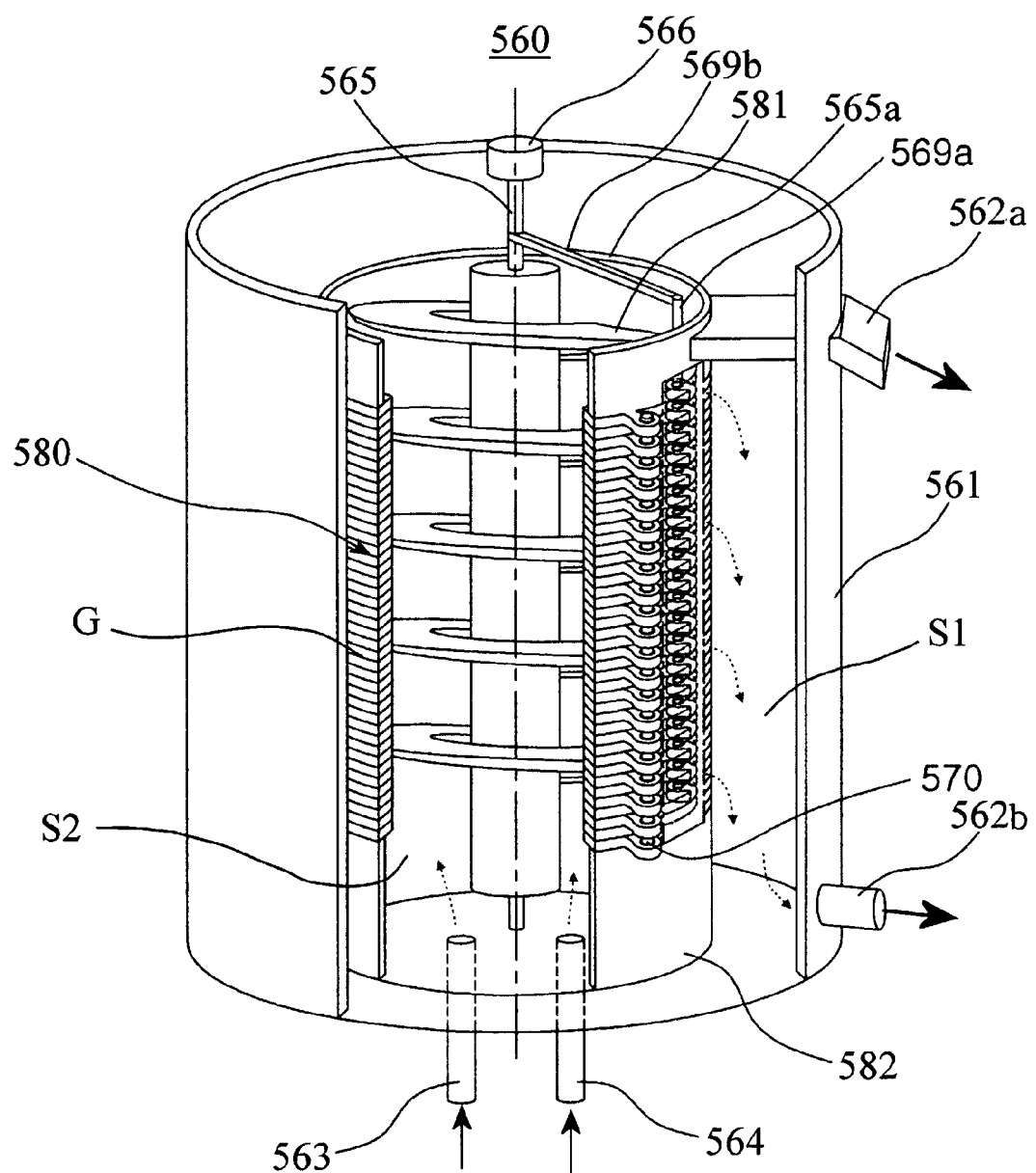
FIG. 10 is a view corresponding to FIG. 8, but schematically showing the construction of a sludge concentration device which is installed in the sludge treatment system according to still another embodiment of the present invention.
Figure 11:
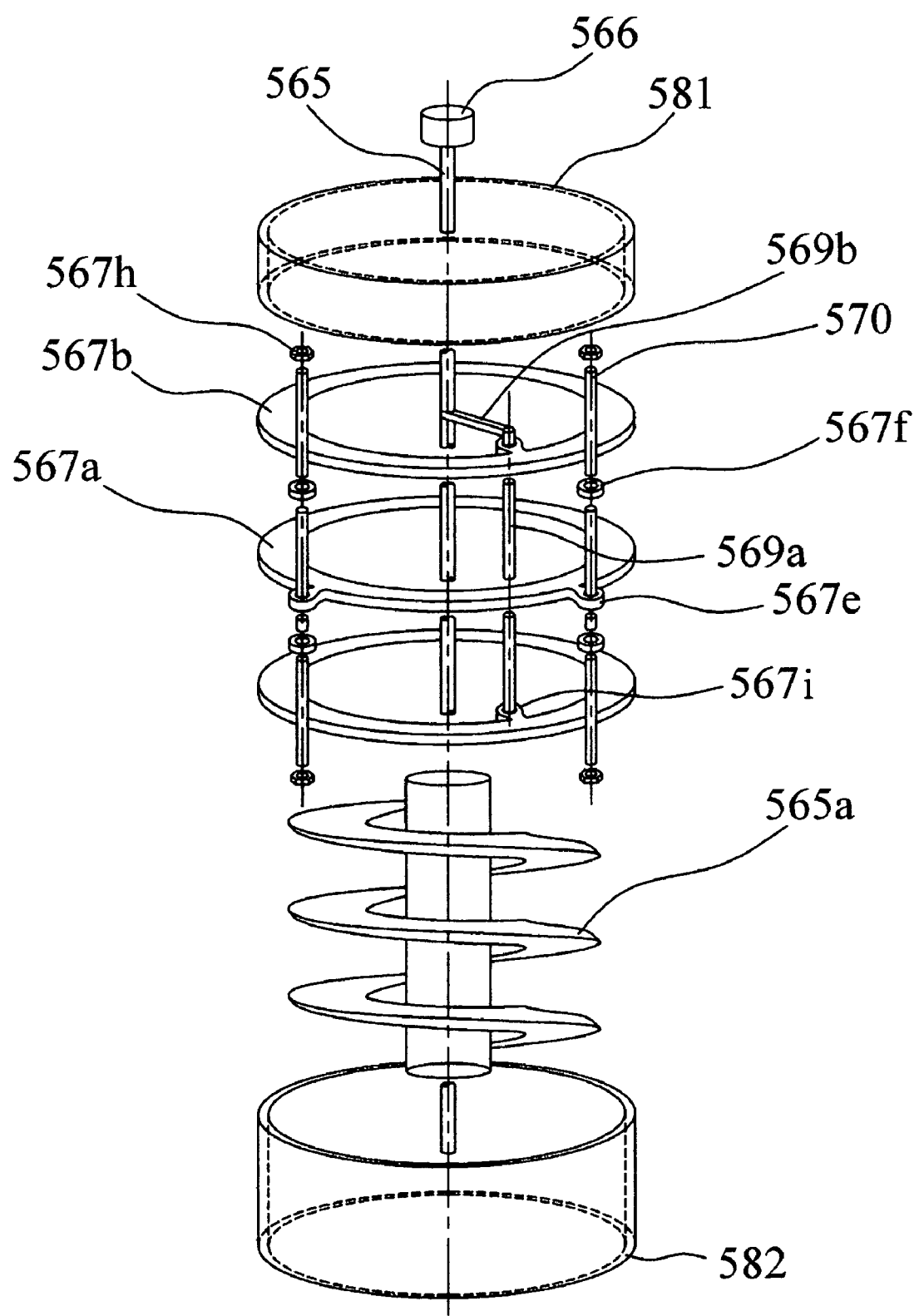
FIG. 11 is a view of a part of the sludge concentration device of FIG. 10.
Figure 12:
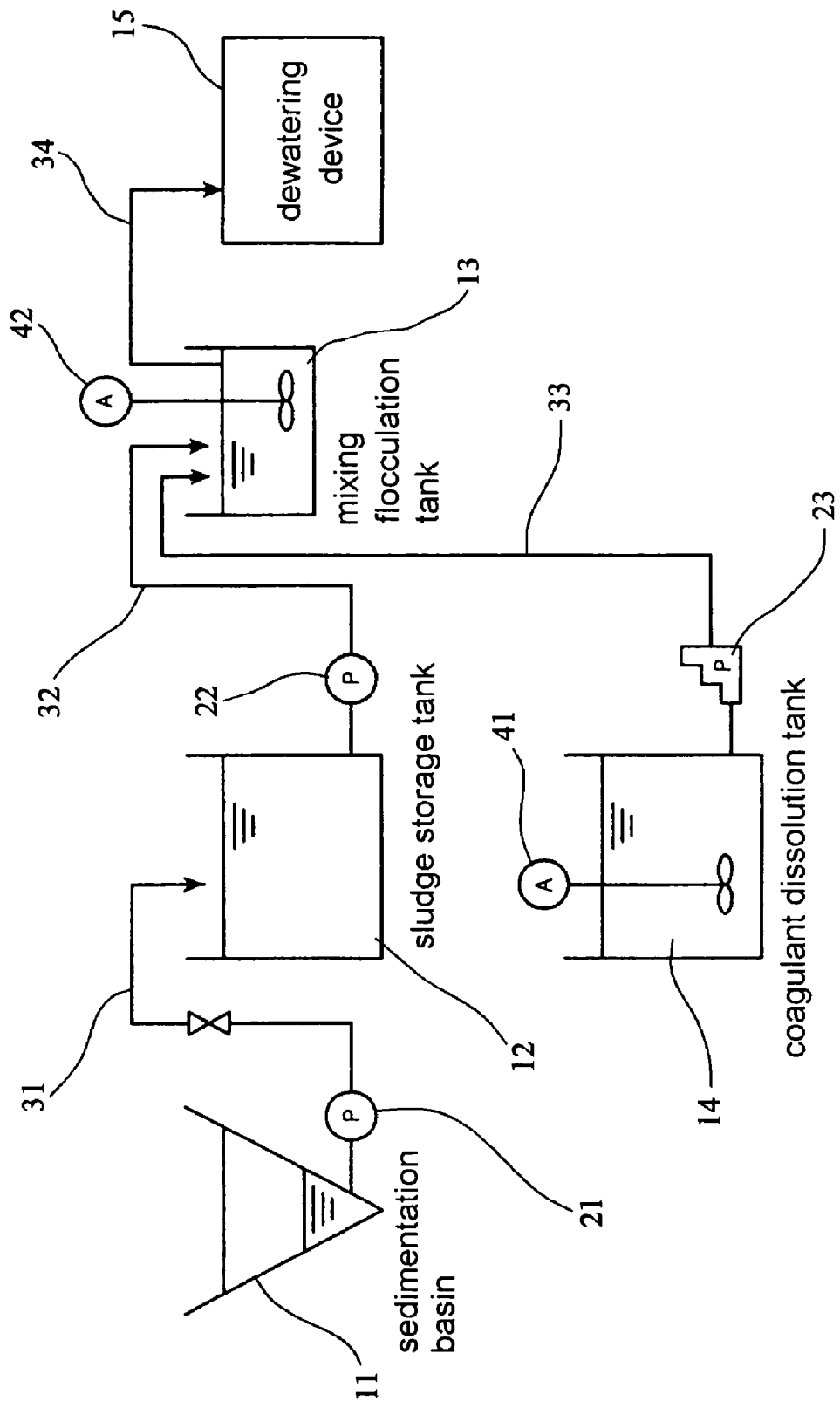
FIG. 12 is a view showing the construction and process sequence of a conventional sludge treatment system.
Figure 13:
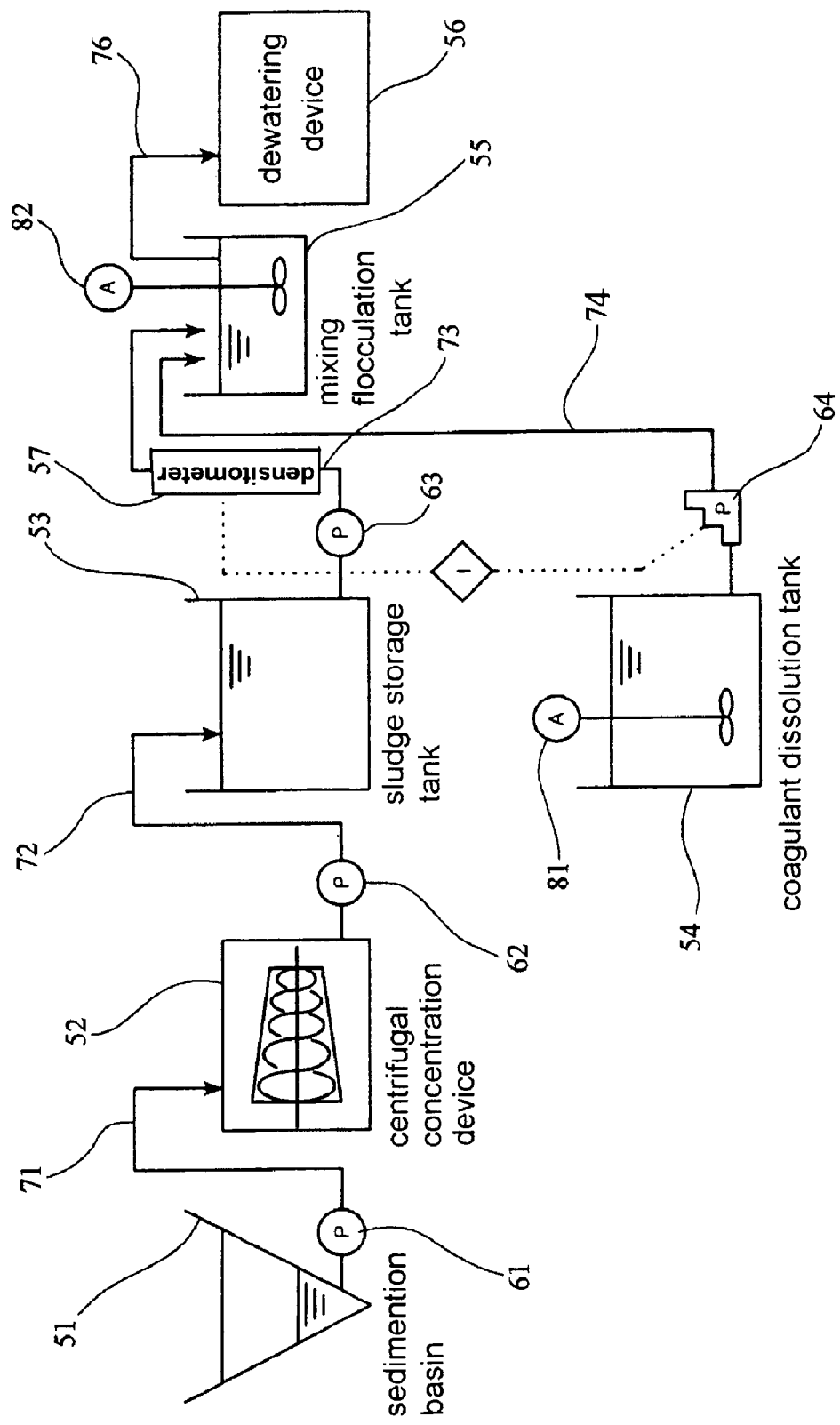
FIG. 13 is a view showing the construction and process sequence of another conventional sludge treatment system.

FIGS. 10 and 11 show the construction of a sludge concentration device 560 which is installed in the mixing flocculation tank 113 according to a fifth preferred embodiment of the present invention.

In the fifth preferred embodiment of the present invention of FIGS. 10 and 11, the general shape of the sludge concentration device 560 remains the same as that of the sludge concentration device 460 according to the fourth preferred embodiment of the present invention which has been described above with reference to FIGS. 8 and 9, except for some parts of the cylindrical structure 580. Therefore, the elements designated by the same reference numerals as those of the fourth preferred embodiment are not described in the following description.

A main shaft 565 is longitudinally provided in the center of the external casing 561 of the sludge concentration device 560 according to the fifth preferred embodiment of the present invention. Furthermore, a helical thread 565a is provided around the radial outer surface of the main shaft 565 in a manner of being integrated with the main shaft 565 into a single body.

An upper support structure 581 opened at upper and lower ends thereof, a plurality of movable disks 567b, a plurality of stationary disks 567a and a cylindrical lower support structure 582 are provided around the main shaft 565 having the helical thread 565a. In the above state, the upper support structure 581, the plurality of movable disks 567b, the plurality of stationary disks 567a and the lower support structure 582 are assembled to each other to provide a cylindrical structure 580. A space S2 to discharge water is defined in the cylindrical structure 580.

Furthermore, a rotary bar 569 is mounted to the main shaft 565 at a position inside the cylindrical structure 580. The rotary bar 569 has the same construction as that of the rotary bar according to the second preferred embodiment of the present invention. In a detailed description, the rotary bar 569 comprises a vertical bar 569a which extends in the external casing 561 in a direction parallel to the main shaft 565, in other words, in a longitudinal direction of the external casing 561. The rotary bar 569 further comprises two horizontal bars 569b which horizontally extend from upper and lower ends of the vertical bar 569a to be mounted to the main shaft 565, thus supporting the vertical bar 569a. Because the rotary bar 569 is mounted to the main shaft 565 at the inner ends of the horizontal bars 569b, the rotary bar 569 during a rotation of the main shaft 565 rotates in the same direction as that of the main shaft 565.

Furthermore, a plurality of ring-shaped projections 567e are provided on the radial outer surfaces of the stationary disks 567a. The stationary disks 567a are assembled with each other into a single body by a locking rod 570 which passes through the plurality of ring-shaped projections 567e. Furthermore, a plurality of ring-shaped spacers 567f are arranged between the stationary disks 567a and the movable disks 567b, so that the stationary disks 567a and the movable disks 567b are spaced apart from each other at predetermined regular intervals, thus defining a gap G between them.

Furthermore, a plurality of ring-shaped projections 567i are provided on the radial inner surfaces of the movable disks 567b. The vertical bar 569a of the rotary bar 569 is inserted into the through holes of the ring-shaped projections 567i. Thus, the movable disks 567b are assembled with each other into a single structure by the vertical bar 569a which is inserted into the ring-shaped projections 567i, so that the movable disks 567b are arranged between the stationary disks 567a to freely rotate. The upper support structure 581, the movable disks 567b, the stationary disks 567a and the lower support structure 582 are integrated with each other into a screen-shaped structure, while the vertical bar 569a of the rotary bar 569 is placed inside the screen-shaped structure.

The inner and outer diameters of the movable disks 567b are determined to be equal to those of the stationary disks 567a.

When the main shaft 565 rotates after the sludge and the coagulant have been introduced into the mixing flocculation tank 113, the movable disks 567b that are spaced apart from the stationary disks 567a at the predetermined regular gaps by the spacers 567f move in a rotating direction of the main shaft 565. Thus, the movable disks 567b rotate and fluctuate relative to the stationary disks 567a.

Herein below, the operational process of the sludge treatment system provided with the above-mentioned a sludge concentration device 560 according to the fifth preferred embodiment of the present invention will be described.

The operational process of the sludge concentration device 560 will be described herein below based on the screen-shaped structure 580 having the gaps G. When the main shaft 565 rotates by the drive motor 566, the sludge and the coagulant, which have been introduced into the interior of the cylindrical structure 580, in other words, into the second space S2 through the sludge inlet line 563 and the coagulant inlet line 564, slowly move upward from the lower portion to the upper portion of the second space S2 by the rotation and agitation of the helical thread 565a of the main shaft 565 while being mixed together.

In the above state, the sludge and the coagulant are mixed and flocculated by the agitation of the helical thread 565a of the main shaft, thus producing flocs and supernatant in the second space S2. The flocs move upward from the lower portion to the upper portion of the second space S2 by the helical thread 565a of the main shaft 565, thus being discharged to the outside through the supernatant discharge line 562b of the upper support structure 581. In the meantime, the supernatant is discharged into the first space S1 through the gaps G of the sludge concentration device 560.

Because, the movable disks 567b are supported between the stationary disks 567a, which are assembled with each other into a single body by the locking rod 570 passing through the plurality of ring-shaped projections 567e of the stationary disks 567a, with the predetermined regular gaps defined between the disks, the supernatant is discharged to the outside through the gaps G defined between the stationary disks 567a and the movable disks 567b.

In the above state, the radial outer surface of the locking rod 570 which passes through the plurality of ring-shaped projections 567e of the stationary disks 567a is in contact with the radial outer surfaces of the movable disks 567b which are smoothly rotated by the vertical bar 569a of the sludge removing rotary bar 569, so that the flocs are removed from the disks. Furthermore, the movable disks 567b fluctuate in a rotating direction thereof relative to the stationary disks 567a, so that the flocs are automatically removed from the gaps G. Thus, the gaps G are efficiently prevented from being blocked with fine flocs. Therefore, the mixture of the sludge and the coagulant smoothly flows into the first space S1 through the gaps G of the cylindrical structure 580. In the meantime, the flocculated sludge is discharged from the first space S1 through the supernatant discharge line 562a provided on the lower portion of the external casing 561.

RESULTS AND ANALYSIS

The results and analysis were determined while assuming that sludge was transferred to the mixing flocculation tank 113 at a constant flow rate of 5 $m^3$/hr by the pumping operation of the second pump 122 and the density of the sludge measured by the first densitometer 157 was 10,000 mg/l. Furthermore, the dewatering device 115 was assumed to most efficiently dewater the sludge when the sludge was transferred at a flow rate of 50 kg ds/hr (2.5 $m^3$/hr) and with a sludge density of 20,000 mg/l. In the above case, water was separated from the sludge in the mixing flocculation tank 113 by mixing, agitating and flocculating the sludge and the coagulant, and was discharged from the sludge concentration device 160 at a flow rate of 2.5 $m^3$/hr. In the above state, the density of the discharged water was 200~300 mg/l which was a negligible level when compared to the density of the sludge transferred to the mixing flocculation tank 113. Thus, when the calculation of the density of the sludge transferred to the dewatering device 115 was executed without considering the density of the discharged water, the density of the sludge transferred to the dewatering device 115 was 20,000 mg/l.

Furthermore, generally, the sludge has been transferred to the mixing flocculation tank 113 by a pumping operation of a quantitative pump, so that the amount of the transferred sludge is constant. When assuming that the sludge was transferred to the mixing flocculation tank at a constant flow rate of 5 mm while the density of the sludge varied to 15,000 mg/l when measured by the first densitometer 157, the sludge concentration device 160 to extract water from the sludge was operated as follows to transfer the sludge from the mixing flocculation tank to the dewatering device 115 with the sludge density of 20,000 mg/l. That is, the automatic sludge/supernatant separation and discharge device 160 separated water from the sludge at a flow rate of 1.25 $m^3$/hr, so that the sludge was transferred to the dewatering device 115 with the sludge density of 20,000 mg/l and at a constant flow rate of 50 kg ds/hr (2.5 $m^3$/hr). Thus, the density of the sludge transferred to the dewatering device 115 can be controlled to a desired level by controlling the amount of water separated from the sludge in the sludge concentration device 160. Alternatively, the above-mentioned results may be achieved by controlling the pumping operation of the second pump 122 which transferred the sludge to the mixing flocculation tank 113 while the amount of the separated water was maintained at a constant level.

Generally, the selection of the coagulant and the determination of the amount of the added coagulant have been determined through a sludge flocculation test called "Jar test". When the flocculated state of the flocs and the extracted state of the supernatant were measured as good states after the mixing flocculation of the transferred sludge and the coagulant were finished, the sludge flocculation provided best results. In other words, the sludge in the above state had the lowest moisture content, so that the separated water in the above state had a low density. Furthermore, a viscosity in the above state was measured and used as a reference value which represented the viscosity that may be obtained by an addition of an appropriate amount of coagulant to the sludge.

The reference value of the viscosity was determined through the Jar test. When water was separated from the sludge and discharged through gaps (mm) after an appropriate amount of suitable coagulant was added to the sludge, the flocs did not pass through the gaps. Thus, the SS density of the discharged water in the above state was measured as 200 mg/l~300 mg/l regardless of the high or low density of the sludge. However, when the coagulant, of which the amount was less than the appropriate amount, was added to the sludge, the density of the discharged water quickly increased.

Therefore, in the preferred embodiment of the present invention, the sludge and the coagulant that have been transferred to the mixing flocculation tank 113 are mixed together to be flocculated by an agitation. In the above state, the density of the water separated from the flocculated sludge is determined as the reference density of the water discharged from the sludge concentration device 160. Thereafter, the coagulant is added to the sludge while controlling both the densitometer and the coagulant pump which are interlocked to each other through a feedback control method so that the SS density of the discharged water measured by the second densitometer 175 approaches the reference SS density of the water. When the SS density of the discharged water is higher than the reference density, the amount of the coagulant which is added to the mixing flocculation tank 113 is not sufficient in comparison with the density of sludge transferred to the mixing flocculation tank 113. Thus, in the above state, the amount of the coagulant to be added to the mixing flocculation tank 113 is increased, so that the density of the discharged water gradually approaches the reference density. Thereafter, the chemical selected as the coagulant is added based on the preset SS reference density. Furthermore, when the sludge transferred to the mixing flocculation tank 113 allows a less amount of the coagulant to be added to the sludge, the amount of the previously added coagulant exceeds the reference amount. In the above state, the surplus amount of the coagulant which has not been used in the sludge flocculation is discharged along with the discharged water. When the viscosity in the above state is measured by the viscometer, the viscometer outputs a signal which represents that the measured viscosity is higher than the reference viscosity. In response to the signal, the system adds a less amount of the coagulant to the sludge while measuring the SS density of the discharged water, so that the SS density does not exceed the allowable error range from the reference density. Thus, the present invention automates the chemical addition device of the sludge treatment system.

INDUSTRIAL APPLICABILITY

As described above, in the sludge concentration process and system which automatically controls the amount of added coagulant and the density of the sludge according to the present invention, sludge is mixed with a coagulant and flocculated in a mixing flocculation tank, so that water is separated from the flocculated sludge and directly discharged from the mixing flocculation tank. In the sludge concentration process, the amount of the separated supernatant is controlled to maintain a constant density of the flocs to be transferred to the dewatering device. Thus, the dewatering device can be stably operated.

Furthermore, the density of the water discharged from the a sludge concentration device which is installed in the mixing flocculation tank is measured to automatically control the amount of the coagulant to be added to the mixing flocculation tank. Thus, the sludge treatment efficiency is improved. Furthermore, the amount of chemicals to be added to the high density or low density sludge can be reduced, so that the consumption of the chemicals is reduced.

Furthermore, the automation of the sludge concentration process and system reduces labor. Furthermore, the water is discharged from the mixing flocculation tank, in place of the dewatering device, different from the conventional process and system. Thus, the load of the dewatering device is reduced, resulting an improvement in the sludge dewatering efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An apparatus for sludge concentration by mixing sludge and coagulant, comprising:
    an external casing to define therein an inner space;
    a cylindrical structure placed within the inner space of the external casing, wherein a plurality of ring-shaped stationary disks and movable disks are alternately laminated and gaps are defined between the movable disks and the stationary disks and the plurality of stationary disks are integrated with one another into a single body;
    a sludge inlet line and a coagulant inlet line connected to a lower portion of the external casing so that the sludge and the coagulant flows into a first space between the external casing and the cylindrical structure;
    an agitator rotating and moving in the first space, thereby inducing mixing the sludge and the coagulant;
    a rotating bar connected to a main shaft rotating the agitator and moving the plurality of the moving disks, thereby removing flocs which are stuck between the gaps;
    a flocs discharge line connected to an upper portion of the external casing and discharging flocs produced by the agitation and mixing of the sludge and the coagulant outside said external casing; and
    a supernatant discharge line extending to a second space formed within the cylindrical structure and discharging a supernatant produced by the agitation and mixing of the sludge and the coagulant which are flowing into the second space through the gaps of the cylindrical structure.

2. The apparatus for sludge concentration as set forth in claim 1, wherein the rotating bar faces the radial outer surfaces of the cylindrical structure and characterized in that the outer diameter of the movable disks is larger than that of the stationary disks and the radius of rotation of the rotating bar is formed to be identical with the outer diameter of the stationary disks.

3. The apparatus for sludge concentration as set forth in claim 1, wherein one or more locking projections are provided on a radial inner surface of each of the stationary disks; pin insert holes are provided to pass through each of the locking projections; and the plurality of stationary disks are integrated with each other by locking pins respectively inserted into the pin insert holes when the pin insert holes are positioned in the same line in the longitudinal direction.

4. The apparatus for sludge concentration as set forth in claim 1, wherein the rotating bar is posited at the radial outer surfaces of the cylindrical structure and characterized in that projections are provided on a radial external surface of the movable disks; holes are formed to pass through the inner wall of the projections; and the plurality of the movable disks are integrated by the rotating bar respectively inserted into the holes when the holes are positioned on the same line in the longitudinal direction.

* * * * *